(12) United States Patent
Soldavini et al.

(10) Patent No.: US 6,796,417 B2
(45) Date of Patent: Sep. 28, 2004

(54) APPARATUS AND METHOD FOR TRANSFERRING ELECTRIC ENERGY ONBOARD OF THE TRAIN OF CARRIAGES OF A SORTING MACHINE FOR OPERATING ELECTRIC EQUIPMENT THEREON

(75) Inventors: Attilio Soldavini, Ferno (IT); Renato Tacchi, Lonate Pozzolo (IT); Erminio Giana, Magnago (IT); Giuseppe Di Giovanni, Gallarate (IT)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/410,209

(22) Filed: Apr. 10, 2003

(65) Prior Publication Data
US 2003/0226740 A1 Dec. 11, 2003

(30) Foreign Application Priority Data
Apr. 12, 2002 (IT) ..................................... MI2002A0785

(51) Int. Cl.$^7$ .............................................. B65G 47/10
(52) U.S. Cl. ................................................ 198/370.06
(58) Field of Search ......................... 198/370.06, 370.1, 198/370.01, 370.03

(56) References Cited

U.S. PATENT DOCUMENTS

| | | | | |
|---|---|---|---|---|
| 5,690,209 A | * | 11/1997 | Kofoed .................. | 198/370.06 |
| 5,701,992 A | * | 12/1997 | Enomoto ............... | 198/370.06 |
| 5,803,230 A | | 9/1998 | Canziani et al. | |
| 6,209,703 B1 | | 4/2001 | Soldavini | |
| 6,253,901 B1 | * | 7/2001 | Hintz et al. ............ | 198/370.06 |
| 6,253,904 B1 | | 7/2001 | Soldavini | |
| 6,253,910 B1 | * | 7/2001 | Axmann ................ | 198/370.06 |
| 6,273,268 B1 | * | 8/2001 | Axmann ................ | 198/370.06 |
| 6,571,933 B1 | * | 6/2003 | Gortz et al. ........... | 198/370.06 |

* cited by examiner

Primary Examiner—James R. Bidwell
(74) Attorney, Agent, or Firm—Burns, Doane, Swecker & Mathis, L.L.P.

(57) ABSTRACT

A sorting system includes a train of carriages moving along a track. Each carriage has an electrically driven cross belt for onloading and unloading items to be sorted. Some, but less than all, of the carriages, i.e., master carriages, carry electricity generating equipment, such as a track-engaging wheel connected to an electrical alternator, for converting kinetic energy of the train into electric energy. That energy is made available to all of the carriages through wiring that interconnects the carriages.

18 Claims, 5 Drawing Sheets

APPARATUS AND METHOD FOR TRANSFERRING ELECTRIC ENERGY ONBOARD OF THE TRAIN OF CARRIAGES OF A SORTING MACHINE FOR OPERATING ELECTRIC EQUIPMENT THEREON

This application claims priority under 35 U.S.C. §§119 and/or 365 to patent application Serial No. MI2002A 000785 filed in Italy on Apr. 12, 2002, the entire content of which is hereby incorporated by reference.

BACKGROUND OF THE INVENTION

The present invention relates to a device and a method for supplying electric energy to functions located onboard of the carriages of a sorting machine, such device being adapted to acquire mechanical energy from the drafting system of said sorting machine and transform it into electric energy.

Such method also provides for the use of the kinetic energy of the same machine as an accumulator from which power may be drawn for short peaks of strong electrical consumption that could sometimes occur.

An object of the present invention is mainly applied to "Cross Belt" sorting machines. These machines consist of an endless train of carriages moving constantly along a path going from the item input stations to the devices for collecting sorted items. The term "Cross Belt" indicates that the item-sorting unit with which the carriage is equipped is a small conveyor belt capable of moving independently, by an electric motor, in either of two directions orthogonal to the running direction of the sorting machine. See, for example, the sorting machines disclosed in U.S. Pat. Nos. 5,803,230, 6,209,703 and 6,253,904, the disclosures of which are incorporated herein by reference.

Such sorting machine is therefore usually activated during the item loading step to bring the same items onboard, and in the unloading step, in one or both directions, to deliver the items to the appropriate destination. The energy required to actuate the conveyor belt is provided by an electric motor onboard of each carriage. The mean power required of a machine for sorting carried items, that is, for activating the motors that actuate the conveyor belts onboard of the carriages, is in the range of 2–3 kW on the overall. However, due to concurrent belt activation, e.g., during unloading, which is possible based on probabilistic combinations relating to the destinations of the items being sorted, electric power peaks of more than 20 kW may sometimes be required for short times.

Of course, it would be advantageous to size the power supply system on the basis of mean power, rather than peak power.

Several methods and devices are known in the prior art which are adapted to transfer, onboard of the train of carriages, the electric energy required to operate the motors drafting the conveyor belts.

A known method for transferring electric energy onboard of the train of carriages consists in a system of busways arranged along the machine and powered by several feeders (typically 70 V, 100 A). Onboard of some carriages there are sliding contacts that allow drawing the energy that will be transferred to the other carriages by wiring arranged along the entire train of carriages. Such solution is technically valid and widely tested, but it exhibits some technical disadvantages. In the first place, it is expensive because the busways, which are made of copper, must be arranged perfectly parallel to the machine. Moreover, if they are loose, they vibrate and cause the breaking of the sliding contacts. In turn, also sliding contacts are expensive since they consist of pantographs that are difficult to implement; moreover, the electrical contacts are subject to wear and to accidental breakage.

Another known method consists in the inductive transmission of electric energy. A pair of wires, forming one or more maxi-turns along the entire machine, forms a closed circuit in which a generator transmits an alternate current of 50–100 A at an approximate frequency of 28 kHz. The current flowing into the two wires generates a concentric magnetic field around the two wires. The E-core of transformers installed on the carriages faces the two wires, thereby closing the magnetic circuit. An alternate current is induced through the turns wound on such core, and it can be straightened and used for powering the onboard motor. Such solution is conceptually simple but it exhibits two serious disadvantages. In the first place, high frequencies induce parasitic currents in metal items placed nearby, so it is necessary to set up suitable protection to prevent attenuation problems and potentially hazardous situations for maintenance personnel. In addition, the solution is not very efficient and does not allow transferring the necessary peak powers, and therefore it implies the need using onboard accumulators to deliver strong current peaks, when required.

Another known method consists in drawing the mechanical energy from the drafting system, for example by a pressure wheel mounted on each carriage, which keeps the machine working at constant speed. The mechanical energy is transferred by each wheel onboard of its respective same carriage, and is transformed into electric energy on the carriage to actuate the conveyor belt onboard of such carriage. A known solution of this type, which should allow sizing the current generators according to the mean power required, consists in using small generators that, drafted by the wheels, produce a small electric power, sufficient for charging batteries placed onboard of the same carriages. Such batteries will return the accumulated energy according to the sorting machine loading and unloading requirements, to satisfy wide possibilities of temporary overload.

However, batteries are heavy, polluting, expensive and have short life; moreover, they must be properly protected since they may be dangerous for the operators in the proximity of the sorting machine, should mechanical jamming occur in the sorting machine, caused by the transported items.

SUMMARY OF THE INVENTION

The present invention proposes a method according to which energy storage is not made in the batteries, but rather in the train of moving carriages. That is, use is made of the wide mechanical energy storage capacity possessed by the train itself, through its own kinetic energy.

The invention is implemented by an electricity generating device capable of drawing—according to the requirements—all the necessary energy from said stored mechanical energy, and of converting it into electric energy for direct use, the electric energy produced by each electricity generating device being supplied to a plurality of, or even all, carriages of the machine.

A limited number of said devices is used, each comprising a wheel drafted and placed in rotation by friction against a fixed track, an alternator placed in rotation by said wheel through a mechanical connection, and an electronic control unit for adjusting and operating said generator. Said devices according to the invention are typically used in the number of one per every 30 carriages approximately. The devices are adapted to operate in parallel to power an electric distribution line to which the carriages of the sorting machine are connected.

Since such devices are limited in number, each of them should be capable of transferring a considerable power onboard of a plurality of the carriages, which above all in the step of current activation of many unloads, implies an intense braking stress for the drafted wheel. That is, electric power peaks place high electric energy demands on the alternators that, in turn, place high mechanical energy demands on the wheels, thereby placing high resistance (braking) to wheel rotation.

In order to prevent sliding of the drafted wheel while such strong power peaks are drawn, by reducing stresses to admissible values, a device has been developed, which is the object of concurrently filed commonly owned U.S. patent application Ser. No. [Attorney Docket No. 024445-297], corresponding to Italian Application No. MI 2002A 000786 filed Apr. 12, 2002, the disclosure of which is incorporated by reference. Reference shall therefore be made to it for the relevant description.

BRIEF DESCRIPTION OF THE DRAWINGS

The device and method according to the invention are hereinafter described in detail, underlining the advantages they exhibit compared to the prior art, with reference to the attached figures, wherein:

FIG. 2b is a rear perspective view of the device of FIG. 2a.

DESCRIPTION OF PREFERRED EMBODIMENTS OF THE INVENTION

Figure 1:
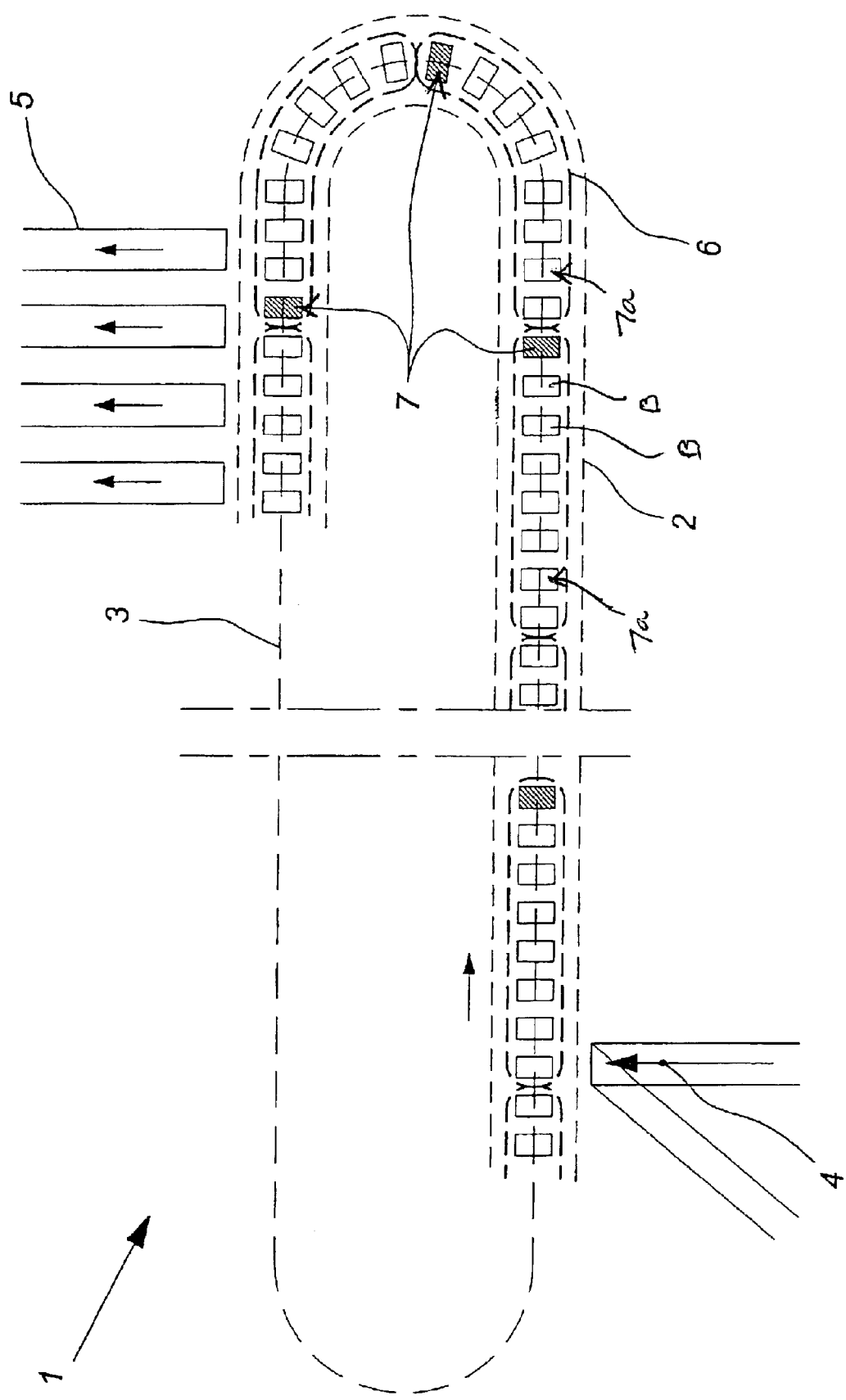
FIG. 1 is a schematic diagram of the sorting machine, with the carriages equipped with the device of the present invention being highlighted.

FIG. 1 shows a sorting machine (1) consisting of a train (2) of carriages (7) and (7a) moving constantly along a path (3) to carry the items to be sorted from a loading station (4) to a destination (5). The destination may be of various types, e.g., a series of loading doors facing onto lorries, if the items are goods or luggage, or onto packaging containers, if the items are sundry items to be packaged. The train of carriages (2) is in turn divided into sub-trains (6), for each of which there is a master carriage (7). Each carriage (7) carries a cross-belt B (FIG. 1) for onloading and unloading items.

Figure 2A:
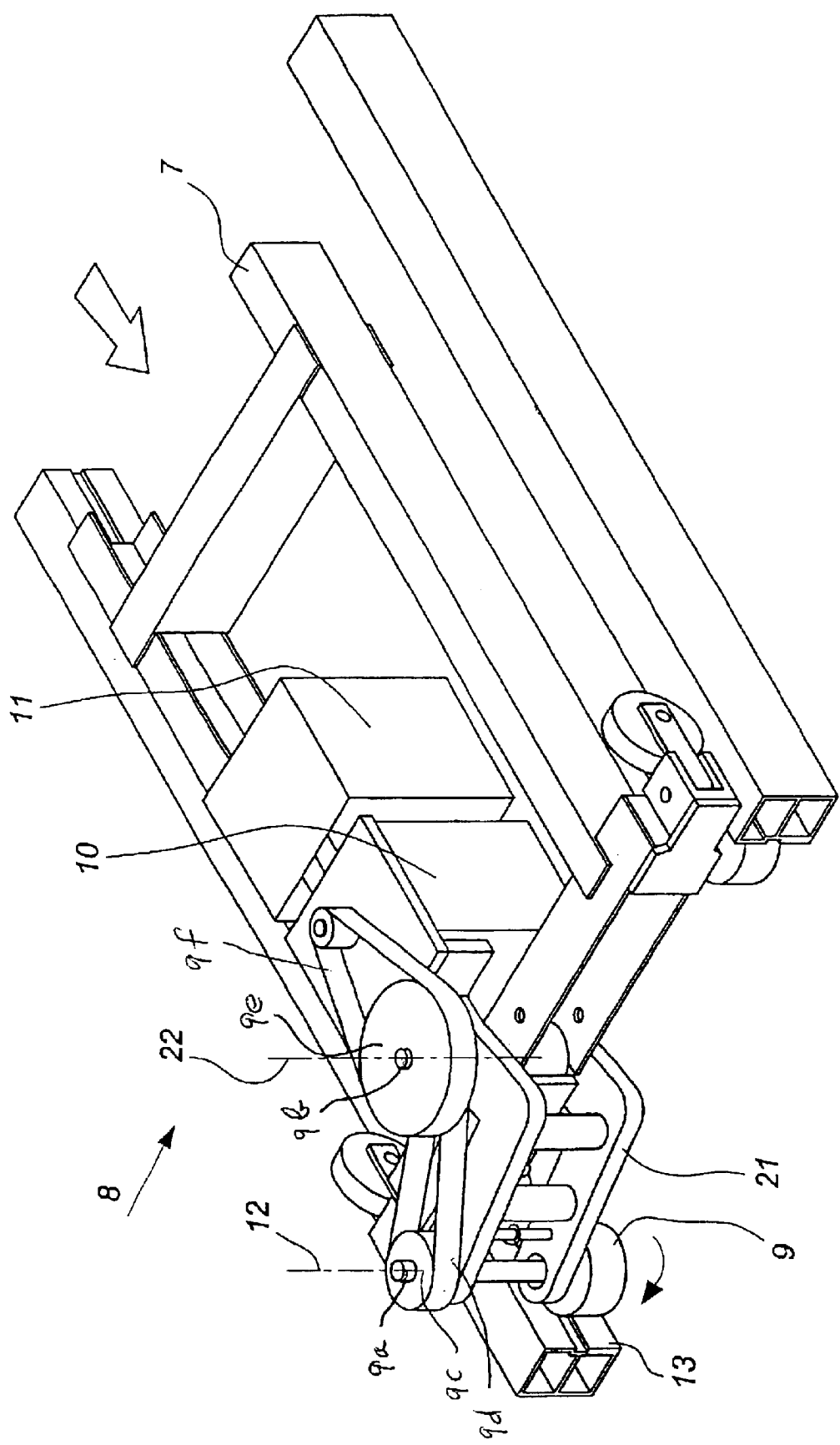
FIG. 2a is a front top perspective view of a master carriage equipped with the device of the present invention.
Figure 2B:
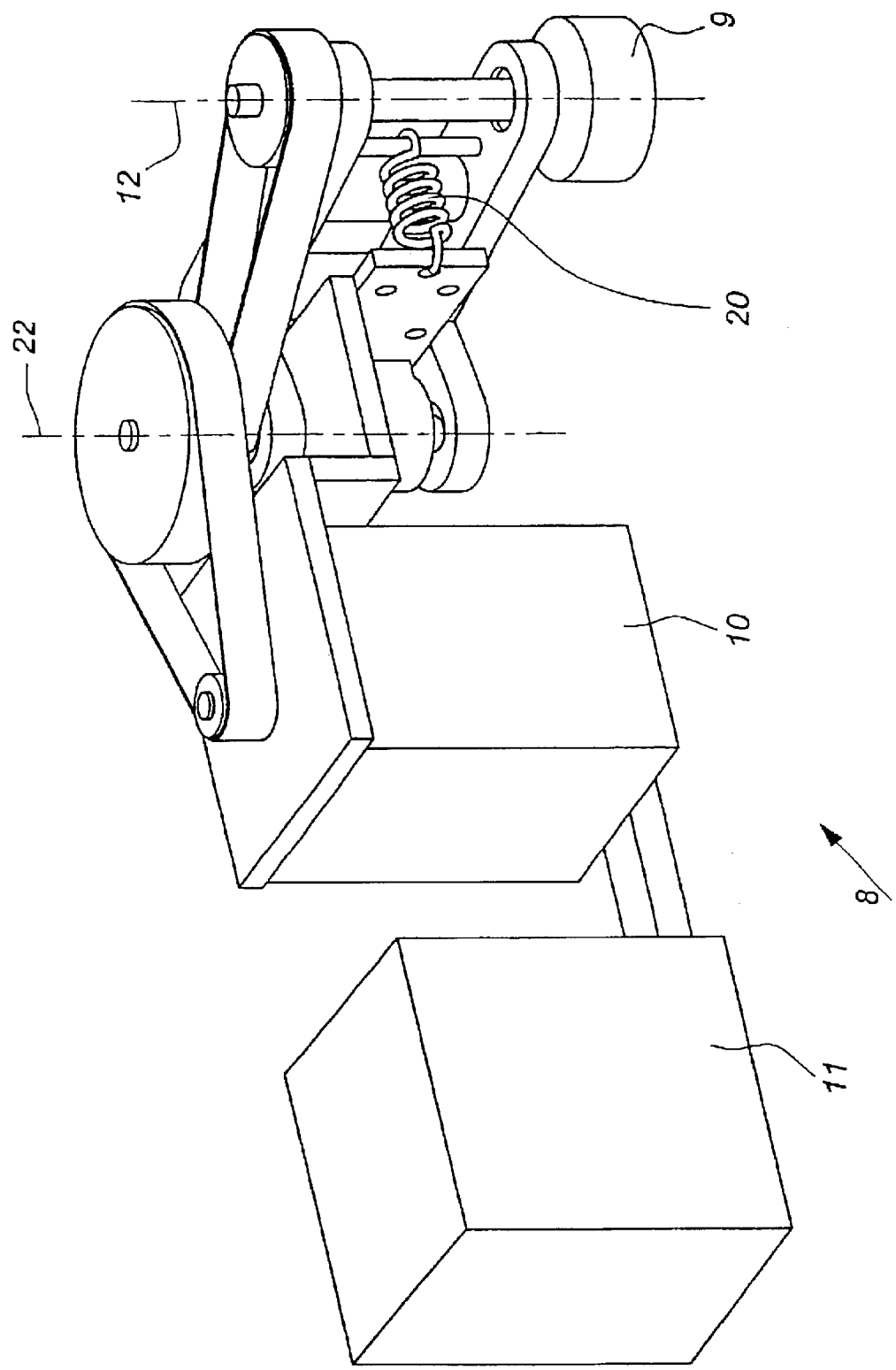

FIG. 2a shows one such master carriage (7) onto which a piece of electricity generating equipment (8) is housed (shown also in FIG. 2b), consisting of a wheel (9) which drives a current generator, such as an alternator (10), and of a control unit (11). The wheel (9) can rotate about an axis (12) and is placed in rotation as the carriage travels, by the effect of friction as the wheel acts against a track (13) arranged along the full path of the carriages. A suitable pre-load is applied to the wheel by elastic means, e.g., a coil spring, (20), that keeps the wheel (9) pressed against the track (13). The spring acts on an arm (21) oscillating around an axis (22) of the carriage (7). Of course said wheel (9) could also be toothed, like a gear, enabling said track (13) to be in the form of a rack.

As the wheel (9) is frictionally rotated, it rotates a shaft (9a) which drives a shaft (9b) via a pulley (9c), a belt (9d) and a pulley (9e). The shaft (9b) drives the alternator (10) via pulley (9e) and a belt (9f). During power peaks, the alternator exerts a braking action on the wheel (9), causing the wheel (9) to be pressed more firmly against the track.

According to a preferred embodiment, as described, said wheel has a vertical axis of rotation. However, it may alternatively have a horizontal axis of rotation, always disposed perpendicular to the carriage running direction. In such a case, the wheel would be moved up (or down) in order to be pressed against the track.

However, a problem of irregular operation of the wheel may occur in transition zones of the track, that is, in non-rectilinear portions of the carriage path. Such a problem occurs in the case of a vertical-axis wheel when the orientation of the wheel axis (12) changes within a vertical plane, i.e., when the slope of the axis changes as the carriage traverses a transition zone in the form of an incline or a decline. In an embodiment wherein the wheel axis (12) is horizontal (instead of vertical as shown in the figures), the change in wheel axis orientation would occur in a horizontal plane as the carriage traverses a transition zone in the form of a corner. The preference for wheels with a vertical axis is due to the fact that curves are always present in sorting machines, whereas slope changes (inclines and declines) are relatively less frequent.

In the described case of a vertical-axis wheel, a slope change at the transition zone results in the wheel being simultaneously subjected to rotational and translational movements, and thereby to an unavoidable sliding condition. Such sliding would occur in a curve if the wheel rotation axis (12) were horizontal instead of vertical.

Figure 3:
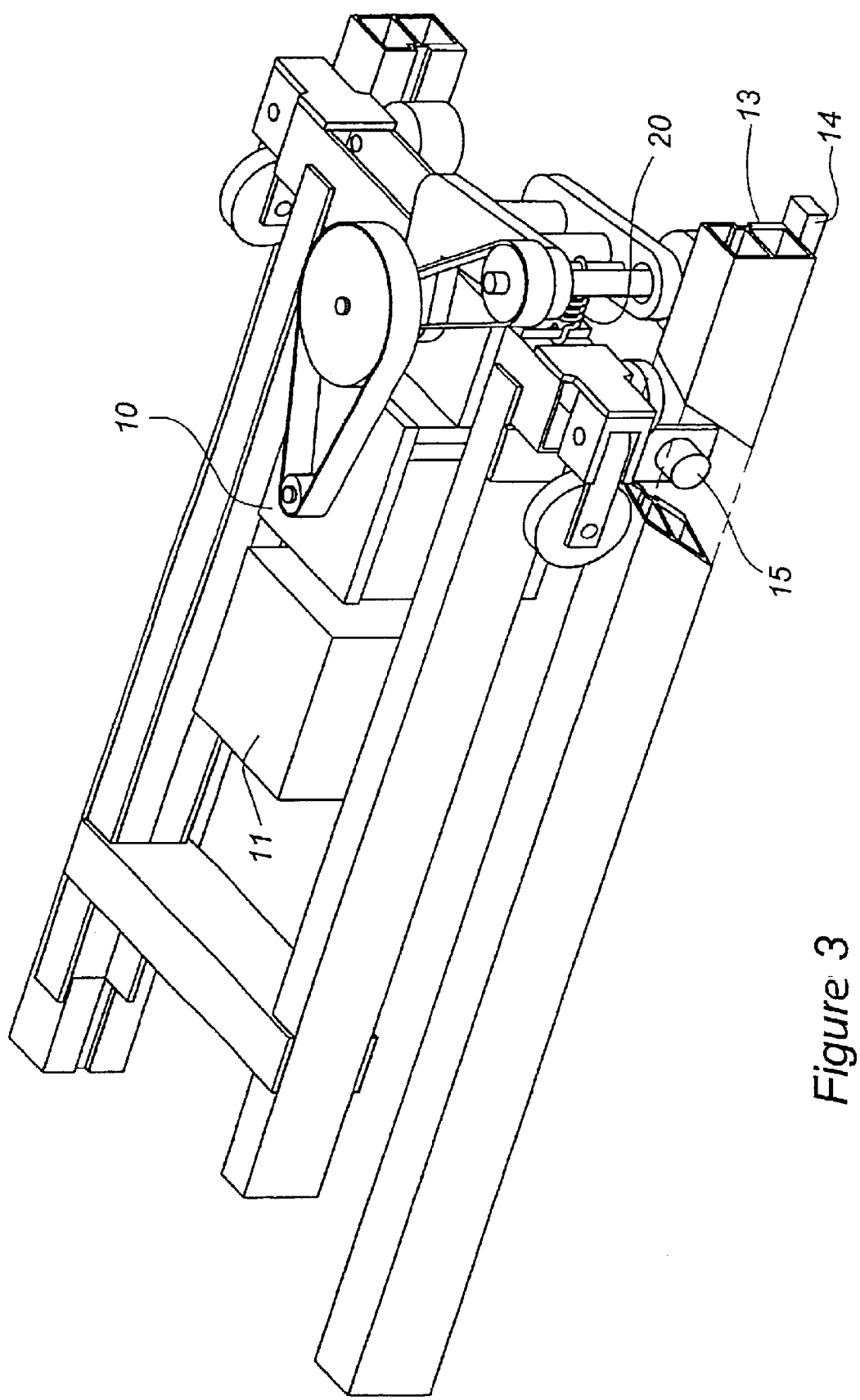
FIG. 3 is a front top perspective view of the master carriage in the proximity of a transition zone of the track.

It will be appreciated that a sliding motion of the wheel along the track produces a wearing of the wheel. That wear rate would be further intensified should the sliding coincide with a momentary increase in power requirement by the loading-unloading system. In that situation, the alternator (10) would exert a very intense braking torque, producing a strong increase of the radial load on the wheel (9) as described in the afore-mentioned concurrently filed patent application Ser. No. [Attorney Docket 024445-297]; the sliding condition mentioned above would therefore cause a strong wear of the same wheel. The present invention provides a solution to this problem by:

positioning the master carriages (7) of the sub-trains (6) such that no more than one of said master carriages is subject to said sliding condition at any given moment, and temporarily cutting out (deactivating) the alternator of the master carriage that is traversing the transition zone, whereby the electric power requirements would be satisfied by the other generators in parallel. The cutout of an alternator is obtained (FIG. 3) by placing a signaler (14) on the track (13) which is detected by a sensor (15) placed on the master carriage (7). The sensor would alert the control unit (11) of the alternator so that, during the short transition zone, no power is delivered, so that the wheel is not further loaded beyond the normal load due to the elastic means (20).

By way of a non-limiting example, said signaler (14) can comprise a simple metal bar arranged along the path, while said sensor (15) can be an inductive proximity sensor suitably placed onboard of the carriage.

Figure 4:
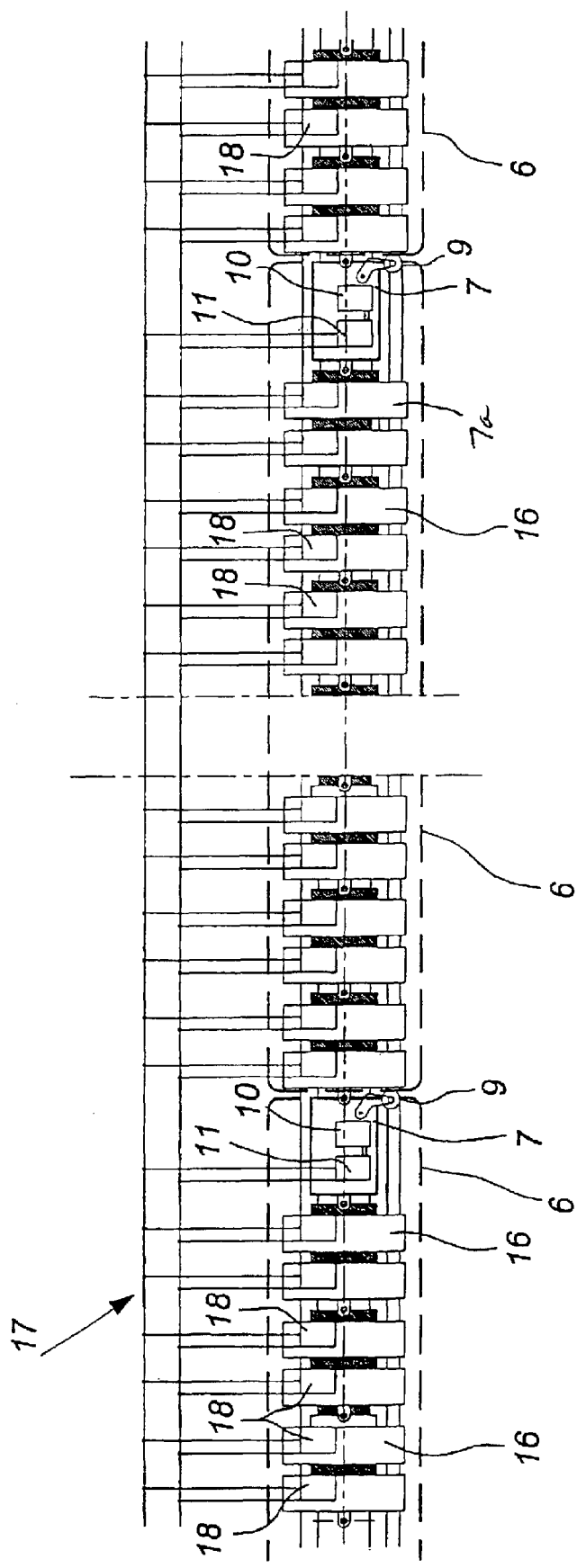
FIG. 4 is a wiring diagram of the train of carriages.

FIG. 4 shows the connections between the master carriages (7) and the other carriages (16). Since the master carriages move with the entire train of carriages, electric energy can be transferred from them to some, but preferably all, of the other carriages by a simple wiring (17).

The outputs of control units (11) of master carriages are therefore connected in parallel on said wiring (17), which runs along the entire train of carriages. All remaining carriages (16) forming the train of carriages (2) with the master carriages (7), draw electric power from said wiring. Electric energy is therefore made constantly available onboard of each carriage when the machine is working, since the train of carriages (2) is moving. When a carriage must perform a loading or unloading operation, using appropriate known procedures, the control system of the sorting machine sends the signal to a receiver arranged onboard of the concerned carriage to activate the control system of an electric motor (18) which actuates the conveyor belt according to suitable methods for properly performing the loading or unloading operation.

The control unit (11) is a PWM electronic controller which acts as a voltage stabilizer, protecting the alternator from short circuits and checking that the current delivered by the alternator does not exceed fixed values. The alternator will produce a nominal voltage of 70 V, with suitable features for the operation in parallel with other alternators, so that a certain number of them may power the wiring (17) connecting all of the necessary equipment.

The control unit uses a simple communication means, such as an infrared emitter or a short-range radio transmitter, to communicate its operating status to the control system of the sorting machine, so that the control system may ensure the sorting activity according to the actual power availability.

In operation, the electric generating equipment (8) of the master carriages (7) produces electric energy as the train continuously moves. That is, the wheels (9) of the master carriages (7) drive the associated alternators to produce the electric power necessary to drive the electric motors of the loading/unloading belts of all carriages. That power is transmitted from each generator to all carriages via the wiring (17).

During periods of peak power requirements, e.g., when multiple loading/unloading operations are concurrently performed as the train moves, power can be taken from the wiring (17), with the wheels (9) becoming pressed more firmly against the track, if necessary to meet the peak demand.

The method described above, to achieve the object of the present invention, exhibits a considerable economic advantage relating to the cost of the electric system powering the machine, since this is capable of meeting the higher requirements of electric power arising from the concentration of several sorting operations in a short time interval, thanks to the possibility of drawing the power peak required by the kinetic energy of the train of carriages. Although that does entail a slowing-down of the train, when one considers the large volumes that are moving, the slowing down will usually be minimal for the purposes of the operations.

The mechanical energy drawn to meet the requirements of the electric power peak is promptly re-entered by the sorting machine draft system, controlled by an automatic regulator to keep the speed of the sorting machine to the required values. With the described solutions it is therefore possible to electrically size the sorting machine on the basis of the electric power required for sorting.

Compared to the prior art method of providing each carriage of the sorting machine with an onboard unit consisting of drafted wheel, alternator, battery and electronic controller, the higher power unit used in the present invention is provided on a limited number of carriages, typically in the number of one unit for every 30 carriages approximately, without any need of using batteries. This implies the following advantages:

economic advantage, due to the lower cost of components, both because batteries are not used and because even though alternators and electronic controllers are more expensive, since more powerful, they are required in a smaller number, i.e., about one for every 30 carriages;

less construction difficulties since the master carriages equipped with an alternator/controller unit are in the number of one for every 30 carriages approximately, and this positively affects also the management of materials in storage and of spares, with further economic advantages also for the user.

Compared to the prior art, which uses busways and sliding contacts, it exhibits the following advantages:

economic advantage, due to the elimination of the high cost of materials and of installation of the busways and of the power supply units sized at the possible power peak;

more reliability, since there are no sliding contacts subject to wear and breakage, whereas the components used in the present invention are intrinsically very reliable and have a long operating life.

Compared to the inductive system that uses a single turn running along the entire path of the train of carriages, it exhibits the following advantages:

high saving on the management of the machine and lower cost of the electric system that must be sized for lower powers due to a higher energy efficiency obtained by the use of highly performing components;

environmental advantages since there is no turn running along the entire path of the train of carriages and is crossed by high intensity (approximately a hundred amperes) and high frequency (in the range of tenths kHz) alternate current, with the relevant disadvantages.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In a sorting system comprising a train of carriages driven along a track, each carriage having an electrically-activated item-displacement device mounted thereon for onloading and unloading items to be sorted, and an electric power generating mechanism carried by at least one of the carriages for converting kinetic energy of the train into electric energy for driving the item-displacement devices, the improvement wherein the electric power generating mechanism is electrically connected to a plurality of carriages of the train for supplying electric energy thereto.

2. The sorting system according to claim 1 wherein the electric power generating mechanism is connected to all of the carriages in the train.

3. The sorting system according to claim 2 further including additional electric power generating mechanisms carried by respective additional ones of the carriages, and each of the additional power generating mechanisms being electrically connected to a plurality of the carriages in the train.

4. The sorting mechanism according to claim 3 wherein each of the electric power generating mechanisms is electrically connected to all of the carriages by wiring extending throughout the train.

5. The sorting system according to claim 1 wherein the at least one carriage on which the electric power generating mechanism is carried constitutes a master carriage, the electric power generating mechanism comprising a wheel rolling along the track to convert kinetic energy of the train into mechanical energy, and an alternator connected to the wheel to convert the mechanical energy into electrical energy.

6. The sorting system according to claim 5 further including a controller for de-activating the alternator while the master carriage traverses a transition zone of the track causing an orientation of an axis of the wheel to change.

7. The sorting system according to claim 6 further including a signaler mounted on the track and a sensor disposed on the master carriage and connected to the controller for supplying thereto a signal for deactivating the generator.

8. The sorting system according to claim 7 wherein the signaler comprises a metal bar, and the sensor comprises an inductive proximity sensor.

9. A method of supplying electric energy to a train of carriages of a sorting system, each carriage having an electrically-activated item-displacement device for onloading and unloading items to be sorted, the method comprising the steps of:

A) producing mechanical energy by engaging the track with a mechanical device disposed on at least one of the carriages which converts kinetic energy of the moving train into mechanical energy, B) converting the mechanical energy into electric energy on the at least one carriage, and C) supplying the electric energy to a plurality of carriages of the train for driving the item-displacement devices thereof.

10. The method according to claim 9 wherein the at least one carriage of steps A and B comprises a plurality of, but less than all of, the carriages, such plurality of carriages constituting master carriages, and step C comprises supplying the electric energy from each of the master carriages to all carriages of the train.

11. The method according to claim 10 wherein step A comprises pressing a wheel against the track to cause the wheel to rotate about an axis, and step B is performed by an alternator connected to the wheel, each of the master carriages having such a wheel and an alternator.

12. The method according to claim 11 wherein the imposing of an electrical load on the alternator causes the alternator to apply a braking force to its respective wheel which results in an increased pressure between the wheel and the track, and further wherein the travel of a master carriage through a transition zone of the track which produces a change in orientation of the wheel axis also produces wear-inducing slippage of the wheel along the track, the method further comprising the step of temporarily deactivating the alternator of any master carriage traversing a transition zone.

13. The method according to claim 11 wherein the imposing of an electrical load on the alternator causes the alternator to apply a braking force to its respective wheel which results in an increased pressure between the wheel and the track, and further wherein the travel of a master carriage through a transition zone of the track which produces a change in orientation of the wheel axis also produces wear-inducing slippage of the wheel along the track, the method further comprising arranging the location of the master carriages such that only one master carriage traverses a transition zone at any given time.

14. The method according to claim 13 further including the step of temporarily deactivating the alternator of any master carriage traversing a transition zone.

15. The sorting mechanism according to claim 4 wherein the carriages are electrically connected to one another in parallel.

16. The method according to claim 9 wherein step C comprises supplying the electric energy to the plurality of carriages electrically connected to one another in parallel.

17. The sorting mechanism according to claim 1 wherein the electricity is supplied to the item-displacement device independent of a battery.

18. The method according to claim 9 wherein step C comprises supplying the electric energy to the plurality of carriages for driving the item-displacement devices independent of a battery.

* * * * *